United States Patent
Voeltz et al.

(10) Patent No.: US 8,323,526 B2
(45) Date of Patent: Dec. 4, 2012

(54) SMECTIC AEROGEL AND METHOD FOR PRODUCTION THEREOF

(75) Inventors: Camilla Olivia Voeltz, Tsukuba (JP); Yoji Maeda, Tsukuba (JP); Yuka Tabe, Nerima-ku (JP); Hiroshi Yokoyama, Tsukuba (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 212 days.

(21) Appl. No.: 12/516,128

(22) PCT Filed: Nov. 16, 2007

(86) PCT No.: PCT/JP2007/072266
§ 371 (c)(1),
(2), (4) Date: May 22, 2009

(87) PCT Pub. No.: WO2008/072445
PCT Pub. Date: Jun. 19, 2008

(65) Prior Publication Data
US 2010/0047479 A1    Feb. 25, 2010

(30) Foreign Application Priority Data
Dec. 13, 2006 (JP) ................. 2006-336120

(51) Int. Cl.
*C09K 19/52* (2006.01)
*C09K 19/06* (2006.01)
*C09K 19/00* (2006.01)
*C09K 19/02* (2006.01)

(52) U.S. Cl. ............. 252/299.01; 252/299.6; 428/1.1; 428/1.2; 428/1.3; 349/182; 349/184

(58) Field of Classification Search ............ 252/299.01, 252/299.6; 430/20; 428/1.1, 1.2, 1.3; 349/182, 349/184
See application file for complete search history.

(56) References Cited

FOREIGN PATENT DOCUMENTS
| JP | 5 117324 | 5/1993 |
| JP | 2001 81274 | 3/2001 |
| JP | 2006 96987 | 4/2006 |

*Primary Examiner* — Geraldina Visconti
(74) *Attorney, Agent, or Firm* — Oblon, Spivak, McClelland, Maier & Neustadt, L.L.P.

(57) ABSTRACT

The present invention is to provide a high quality smectic aerogel which is not brittle and a method for producing the smectic aerogel by using a host material comprising a mixture of a smectic liquid crystal and a UV-curable material or a host material comprising a smectic UV-curable material and by selecting an appropriate host material. A smectic aerogel comprising 4-nonyl-4'-cyanobiphenyl (9BC) and air bubbles can be produced, wherein hexagonal or pentagonal air cells are separated from each other by a smectic layer comprising a smectic liquid crystal. The thickness of the wall of the smectic layer at the boundaries of the air cells is about 24 μm, which corresponds to about 6000 smectic layers. The thickness of the wall of the smectic layer at the boundaries can be varied. Particularly, the thickness can be reduced to as thin as several smectic layers.

22 Claims, 5 Drawing Sheets

# SMECTIC AEROGEL AND METHOD FOR PRODUCTION THEREOF

TECHNICAL FIELD

The present invention relates to a smectic aerogel and a production method thereof.

BACKGROUND ART

An aerogel is a solid state meso-porous material having open cells which has a porosity of 50% or more in volume. Typically, the aerogel is composed of 90 to 99.8% of air, with density ranging from 1.1 to about 150 mg/cm$^3$. At the nanoscale, an aerogel structure resembles a sponge, and comprises a network structure of nanometer-sized voids connected with each other.

The aerogel can be made of various materials such as silica (SiO$_2$), alumina (Al$_2$O$_3$), oxides of transition metal and lanthanide metal, metal chalcogenide including CdS and CdSe, organic and inorganic polymers, carbon, and the like.

An aerogel has, in general, an extremely high rigidity for its density, and can support a weight 2,000 times or more than the weight of itself. The aerogel also serves as an excellent thermal insulation material since it almost nullifies three factors of heat transmission, i.e. convection, conduction, and radiation. Furthermore, the aerogel serves as a good material for preventing heat convection, since air cannot circulate throughout the lattice. The aerogel works as a desiccating agent since it has a hygroscopic property.

Technologies concerning liquid crystals can be referred to Non-Patent Documents 1 and 2 mentioned below.
[Non-Patent Document 1] S. Urban, J. Przedmojski, and J. Czub, Liquid Crystals, Vol. 32, No. 5, pp. 619-624 (2005).
[Non-Patent Document 2] EKISHOUBINRAN (Handbook of liquid crystal), ed. by committee of EKISHOUBINRAN (Handbook of liquid crystal), published by MARUZEN on Oct. 30, 2000.

DISCLOSURE OF THE INVENTION

The aerogel according to the present invention is easy to produce, air cells thereof exhibit a regular order, and a thickness of a wall at the boundary between the air cells can be as thin as a few molecular (smectic) layers (on the order of nanometers). Furthermore, gas is separated in individual gas cells.

On the contrary, conventional aerogel comprises a host material formed in a fractal-like structure, and the gas is captured within its network. In addition, the conventional aerogel is very brittle.

In view of the situation described above, an object of the present invention is to provide a high quality smectic aerogel which is not brittle and a production method thereof by using a host material comprising a mixture of a smectic liquid crystal and a UV-curable material or a host material comprising a smectic UV-curable material and by selecting an appropriate host material.

To fulfill the object described above, the present invention provides:
[1] A smectic aerogel comprising a host material including a smectic liquid crystal material with a smectic phase and a UV-curable material capable of fixing permanently an aerogel structure after formation thereof.
[2] A smectic aerogel comprising a host material including a smectic UV-curable material with a smectic phase capable of fixing permanently an aerogel structure by UV irradiation after formation thereof.
[3] The smectic aerogel described above in [1], wherein the UV-curable material is a monomer having a group of acrylate or methyl acrylate.
[4] The smectic aerogel described above in [1] or [2], wherein a gas cell is formed by injecting a spherical gas inclusion with a desired size into the host material.
[5] The smectic aerogel described above in [4], wherein gas in the gas inclusion is air, inert gas, other gas, or mixed gas thereof.
[6] The smectic aerogel described above in [4], wherein a thickness of a wall at the boundary between the gas cells is a thickness corresponding to a few molecular (smectic) layers on the order of nanometers.
[7] The smectic aerogel described above in [4], wherein the gas inclusion is arranged orderly and the gas cell is of a hexagonal or a pentagonal shape.
[8] The smectic aerogel described above in [1], wherein the host material is fixed permanently by UV irradiation.
[9] The smectic aerogel described above in [1] or [2], wherein the host material can have any desired shape.
[10] The smectic aerogel described above in [1] or [2] wherein the host material is formed in a bulk shape, and can be cut from the bulk into a desired shape.
[11] A production method for a smectic aerogel, comprising: providing a smectic liquid crystal as a host material, mixing the smectic liquid crystal with an ultra-violet (UV)-curable material, and curing the material to fix a structure of the material permanently by UV irradiation.
[12] The production method of a smectic aerogel described above in [11], wherein the host material is a smectic liquid crystal of 4-nonyl-4'-cyanobiphenyl (9CB) at a temperature in a range from 42° C. to 48° C.
[13] A production method for a smectic aerogel, comprising: providing a smectic UV-curable material as a host material, and curing the material to fix a structure of the material permanently by UV irradiation.
[14] The production method of a smectic aerogel described above in [11] or [13], wherein a spherical gas inclusion with a desired size is injected into the host material.
[15] The production method of a smectic aerogel described above in [11] or [13], wherein by placing a suspension including the host material and the gas inclusion under a hydrostatic pressure which is lower than a pressure during the injection of gas, a diameter of the gas inclusion is increased, thereby reducing a thickness of a wall between the gas cells to obtain a desired size of the gas cell and a desired thickness of the wall at the boundary thereof.
[16] The production method of a smectic aerogel described above in [15], wherein the thickness of a wall at the boundary is formed to be a thickness corresponding to several smectic layers in nanometer size.
[17] The production method of a smectic aerogel described above in [14], wherein the gas inclusion is arranged orderly and the gas cell is of a hexagonal or a pentagonal shape.
[18] The production method of a smectic aerogel described above in [11] or [13], wherein the host material is fixed permanently by UV irradiation.
[19] The production method of a smectic aerogel described above in [11] or [13], wherein the host material can be formed into any desired shape.
[20] The production method of a smectic aerogel described above in [11] or [13], wherein the host material is formed in a bulk shape, and can be cut from the bulk into a desired shape.

BEST MODE FOR CARRYING OUT THE INVENTION

According to the present invention, a smectic aerogel can be obtained which comprises 4-nonyl-4'-cyanobiphenyl (9CB) and air bubbles (air cells), wherein hexagonal or pentagonal air cells are separated from each other by smectic layers of a smectic liquid crystal. A wall thickness of the smectic layers at the boundary is about 24 μm, which corresponds to about 6000 smectic layers. Naturally, the wall thickness of the smectic layers at the boundary can be varied, especially can be reduced to a thickness corresponding to several smectic layers.

Embodiments

Embodiments of the present invention will be described hereinbelow in detail.

Figure 1:
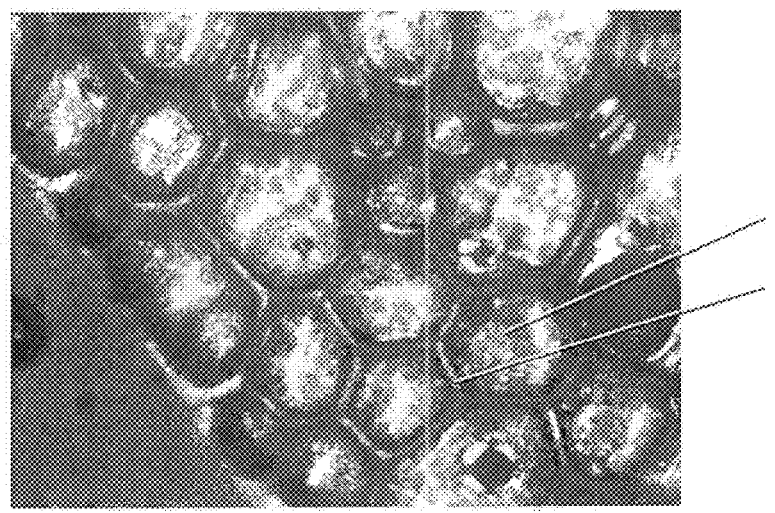
FIG. 1 shows a top view of a smectic aerogel sample in accordance with the present invention.

FIG. 1 shows a top view of a smectic aerogel sample in accordance with the present invention.

This figure shows a 4-nonyl-4'-cyanobiphenyl (9CB) smectic aerogel sample comprising pentagonal and hexagonal air cells 1 separated from each other by a wall of smectic layers at the boundary. A thickness of a wall 2 of the smectic layers at the boundary of this aerogel sample is 24 μm, which corresponds to about 6000 smectic layers. The width of this figure is 1.75 mm.

A smectic liquid crystal is used here as a host material. In order to fix a structure thereof permanently, the smectic liquid crystal is mixed with a ultra-violet (UV)-curable material, and the structure of the material is cured by UV irradiation.

In an alternative production method of the smectic aerogel, a UV-curable smectic material is used as the host material.

The smectic host material is required because the smectic material allows the thickness of the wall 2 of the smectic layers at the boundary separating two air cells 1 to be reduced to as thin as several smectic layers. When the thickness of each of the smectic layers is about 4 nm, the wall 2 of the smectic layers at the boundary between the air cells 1 can be reduced to as thin as a several nanometers.

The aerogel becomes more difficult to produce if a nematic liquid crystal is used in place of the smectic liquid crystal. This is because the organized structure of the nematic liquid crystal is not lamellar, and therefore it becomes difficult to stabilize the thickness of the wall 2 of the smectic layer at the boundary separating the air bubbles on the order of several molecules. Therefore, the smectic liquid crystal is preferably used.

Figure 2:
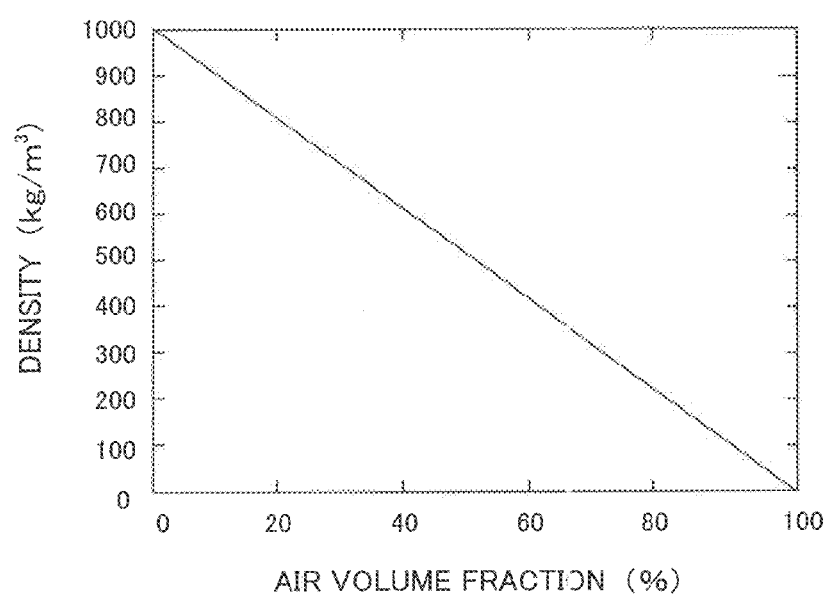
FIG. 2 shows a graph illustrating the change in density of an aerogel according to the present invention as a function of an air volume fraction.
Figure 3:
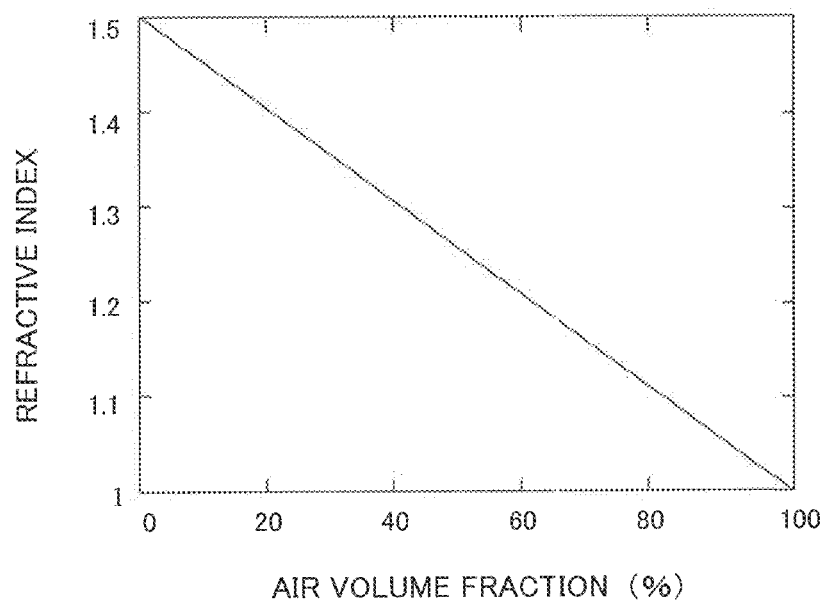
FIG. 3 shows a graph illustrating the change in refractive index of the aerogel according to the present invention as a function of the air volume fraction.

FIG. 2 shows a graph illustrating the change in density of the aerogel according to the present invention as a function of an air volume fraction. FIG. 3 shows a graph illustrating the change in refractive index of the aerogel according to the present invention as a function of the air volume fraction.

Physical properties such as density and refractive index can easily be changed by changing the size and the volume fraction of the air bubble. In addition, inert gas, other gas, or a mixture of such gases can also be used in place of air. Thus, it is able to change the properties of the aerogel, and to design it to match with user-specified specifications.

As shown in FIG. 2, the density of the aerogel can be changed dependently upon the air volume fraction between about 1,000 kg/m$^3$ for the air volume fraction of 0% and 1.29 kg/m$^3$ for the air volume fraction of 100%. A typical value of the density is between 1.3 kg/m$^3$ and 400 kg/m$^3$.

Similarly, as shown in FIG. 3, the refractive index of the aerogel can be changed dependently upon the air volume fraction between about 1.5 for the air volume fraction of 0% and 1.0 for the air volume fraction of 100%. A typical value of the refractive index is 1.2 or less.

Alternative to changing the air volume fraction, a size of the air cells and the thickness of the wall of the smectic layer at the boundary can be changed, thereby enabling to change the physical properties of the aerogel material over a wide range.

The material can be produced in either form as a thin sheet form including only a single layer of the air cell or as a three dimensional cubic form of the aerogel. Since a mold to hold the host material used in the production can be made in any desired form, the material can adopt a variety of three dimensional geometries. Alternatively, any desired form can also be cut out of the three dimensional block of aerogel.

Figure 4:
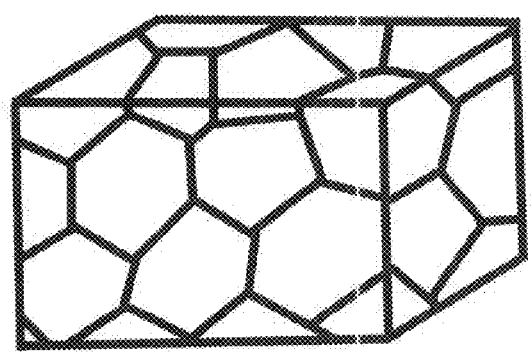
FIG. 4 shows a schematic diagram of a three-dimensional aerogel sample in accordance with the present invention.
Figure 5:
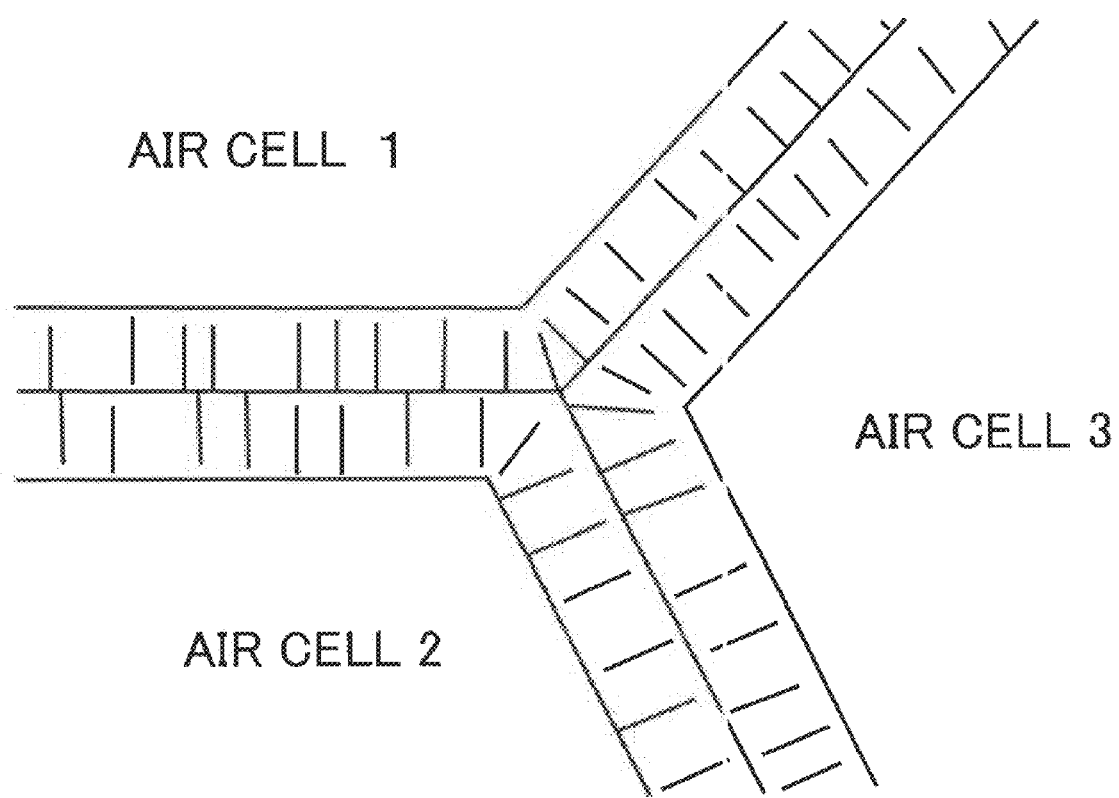
FIG. 5 shows a detailed diagram illustrating walls of smectic layers at the boundary between air cells according to the present invention.

FIG. 4 shows a schematic diagram of the three-dimensional aerogel sample in accordance with the present invention. FIG. 5 shows a detailed diagram illustrating walls of the smectic layers at the boundary between the air cells according to the present invention.

In this schematic diagram, only two smectic layers are depicted, but the number of the smectic layers can, in principle, range from two to several thousands or even more. In these diagrams, a layer of smectic A material is depicted, but a layer of other smectic material such as a smectic C material may be used.

Advantages of the material according to the present invention over the materials according to the conventional technologies are that the present material is easier to produce, that the air cells exhibits a regular order in the present material, that the thickness of the wall at the boundary can be reduced to the order of the several smectic layers (nanometers), and that in the present material, gas is separated into a plurality of single cells. On the contrary, the host material of the conventional aerogel has a fractal-like structure and the gas is captured in this network. In addition, in contrast to the conventional aerogel which is very brittle, the aerogel according to the present invention is not brittle, but rather robust because it has a "honeycomb-like structure" as shown in FIG. 1, for example.

Applications/Examples

The smectic aerogel according to the present invention can replace other types of aerogels, for example a silica aerogel, in their current application fields. Therefore, the potential application fields for the smectic aerogel according to the present invention include, but are not limited to:

(1) special-purpose thermal insulation materials such as a transparent thermal insulating material;
(2) acoustic insulating materials;
(3) vibration attenuating materials;
(4) desiccating agents;
(5) chemical absorbents;
(6) catalysts or catalyst supports;
(7) an aerogel blanket (a composite of a silica aerogel with a fiber-like reinforcing material to change a brittle aerogel to a durable and flexible material.): since the aerogel according to the present invention is not as brittle as the conventional aerogel, its application fields as the flexible material are wider and thus advantageous as compared with the conventional aerogel;
(8) the aerogel used by NASA to capture dust particles in the cosmic space for "Stardust" missions: particles collide with a solid, evaporate, pass through gas, and finally are captured by the aerogel; and.
(9) the aerogel used in the field of elementary particle physics as a detector for Cherenkov radiation: reasons for preference of the aerogel comes from the facts that the aerogel has a small refractive index, that the aerogel is transparent and can occupy a space between gas and liquid, and that the aerogel is a solid state and therefore easier to use as compared with cryogenic liquid or compressed gas. A fact that the aerogel has a small mass makes it more advantageous for missions in the cosmic space.

By adding a dopant or by making it a reinforced structure or composite, properties of the aerogel will be further enhanced for some specific applications. By these approaches, the aerogel material group according to the present invention can have wider application fields.

Production Process

The aerogel according to the present invention can be produced by two methods, i.e., from two different host materials.

In the first case, the host material comprises following two compounds.

(a) The smectic liquid crystal of, for example, 4-octyl-4'-cyanobiphenyl (8CB) at a temperature from 21.5° C. to 33.5° C., or 4-nonyl-4'-cyanobiphenyl (9CB) at a temperature from 42° C. to 48° C. Alternatively, other smectic A material or smectic C material can be used.

(b) A curable material to fix the structure of the smectic aerogel, such as an a monomer having a group of, for example, acrylate or methyl acrylate, a UV-curable material such as UCL-001-K1 and UCL-011-K1 available from DIC Corporation, or other UV-curable materials which can be mixed with a smectic mesogen. A ratio of two materials may be 1:1 or may be different.

In the second case, the host material comprises a smectic UV-curable material such as UCL-019-K2 available from DIC Corporation, or other smectic A or smectic C UV-curable material.

Air bubbles with substantially uniform size are injected into the host material, thereby a lattice of dense air bubbles is formed. The injection of the air bubbles is performed into a nematic phase, because a viscosity of the nematic phase is usually lower than that of a smectic phase. Of course, in general, the injection of air bubbles may also be carried out into a smectic phase. The air bubbles during the injection suitably have the size on the order of micrometers or millimeters, but may in general be various sizes. The injection of the air bubbles is performed using one or more capillary tubes. Generally, as many capillary tubes as desired can be used simultaneously for gas injection. The cell containing a suspension including the liquid crystal host material and air bubbles has to be open on sides for pressure adjustment and closed on the top surface. Otherwise, the air bubbles move upward due to the buoyancy, and would be broken at the surface of the suspension when a low pressure is applied. Thus a sandwich type cell is in general used to accommodate such a material.

In the case when the nematic host material is used for injecting the air bubbles, the material is cooled down to change from a nematic phase to a smectic phase. The sandwiched cell is then introduced into a pressure vessel. Low hydrostatic pressure is applied to the sample. Induced by the low hydrostatic pressure, air bubbles increase in size, thereby decreasing the amount of material between the air bubbles. As an alternative method, cooling down to the smectic phase and inflation of the air bubbles can be performed simultaneously. By measuring the thickness of the wall at the boundary using a microscopy, the layer thickness can be monitored in real time.

Figure 6:
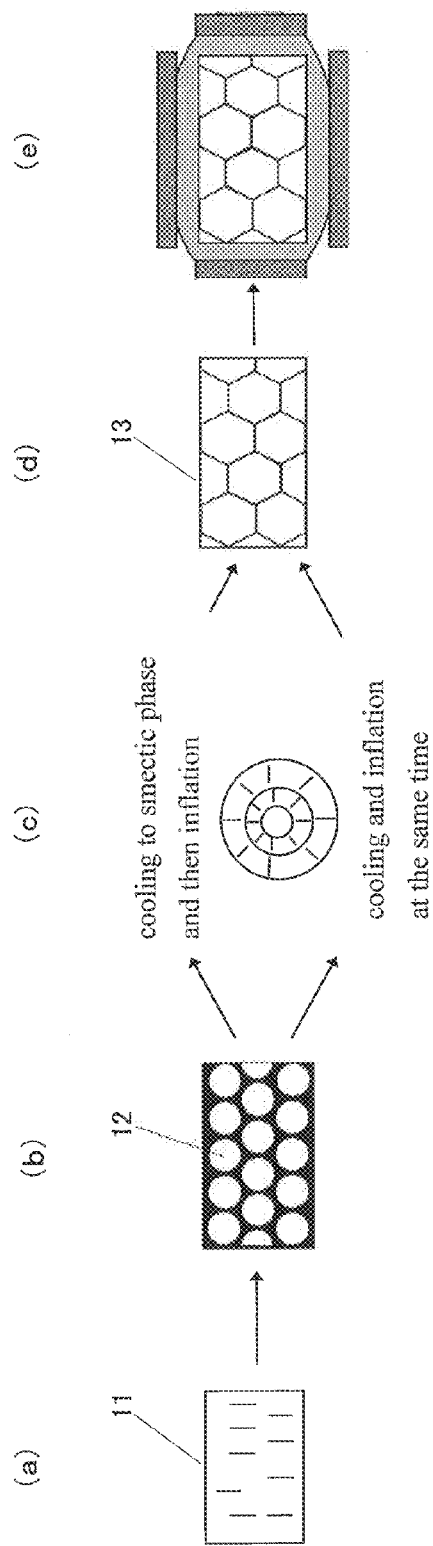
FIG. 6 shows a schematic diagram illustrating an overall process of production of the smectic aerogel in accordance with the present invention.

When the thickness of the wall at the boundary between neighboring gas cells reaches a desired value and the material exhibits a consistency of a smectic foam, irradiation of an ultra-violet (UV) light is performed to the material. Either of a near UV light (380 nm to 200 nm), a far UV light (200 nm to 10 nm), or an extreme UV light (1 nm to 31 nm) can be used. By this irradiation, the structure of the smectic aerogel is fixed permanently. The UV irradiation is continuingly performed until the solidification of the aerogel is completed. Time duration of the UV curing can be shortened by increasing the number of UV irradiation sources or by increasing the output energy of the UV irradiation source. The UV irradiation can be performed either from one side of the sample or from two or more sides of the sample simultaneously. The overall process of production is schematically shown in FIG. 6.

First, a nematic host 11 is provided, as shown in FIG. 6(a). Next, air bubbles 12 are injected into the nematic host 11, as shown in FIG. 6(b), which is followed by cooling to a smectic phase and then inflation, or cooling and inflation at the same time, as shown in FIG. 6(c). Then, a smectic foam 13 is formed, as shown in FIG. 6(d). Finally, UV curing is performed to produce a smectic aerogel, as shown in FIG. 6(e).

Production Experiment

An experiment on production of a smectic aerogel was performed by using a host material comprising a smectic liquid crystal, 4-nonyl-4'-cyanobiphenyl (9CB), having a smectic A phase at a temperature from 42° C. to 48° C. and a nematic UV-curable material UCL-011-K1. Two materials were mixed with a ratio of about 1:1. The UV-curable material was a monomer having a nematic liquid crystal phase prior to irradiation, and becoming a polymer after UV irradiation.

Figure 7:
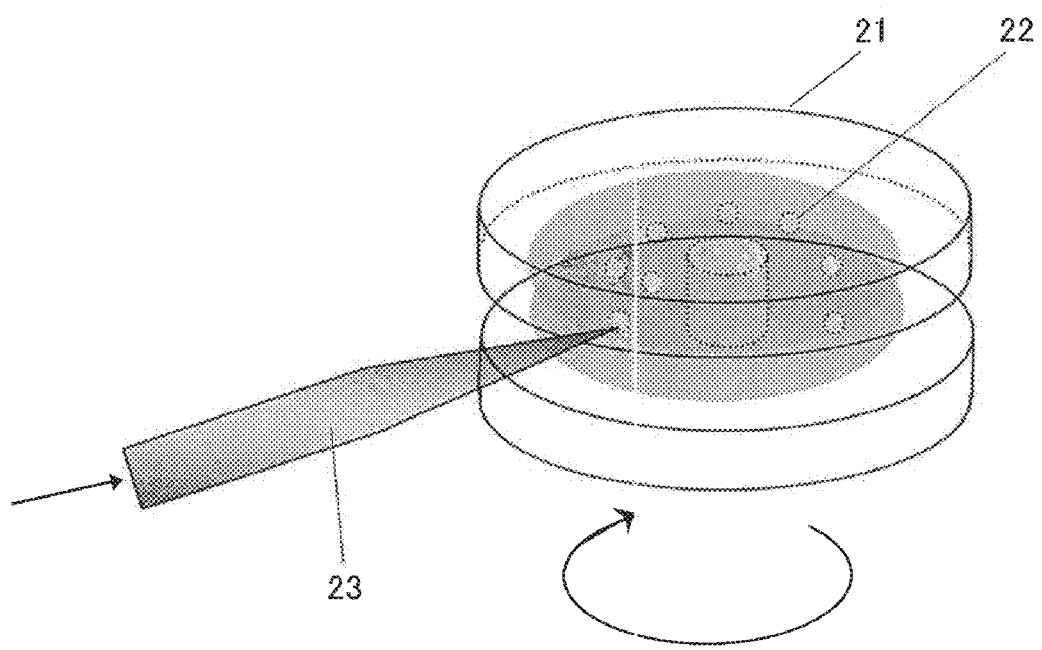
FIG. 7 shows a schematic diagram illustrating a part of the production process of the smectic aerogel in accordance with the present invention.

Air (bubble) with an approximately uniform, micrometer size was injected through a glass capillary tube of a micrometer size into the host material to form a high density lattice of air bubbles. The material was sandwiched between two glass plates separated from each other by a spacer. As shown in FIG. 7, the sandwiched cell 21 including the smectic liquid crystal was rotated during the process of injection of air (bubble) 22 by a capillary tube 23. The sandwiched cell 21 was, then, introduced into a pressure vessel (not shown) which was connected to an aspirator. A low hydroststic pressure of 0.02 to 0.08 MPa was applied to the sample. Induced by the low hydrostatic pressure, the size of air (bubble) 22 increased, thereby reducing the material between air (bubbles) 22 in amount until the gas cells are separated from each other by a wall at the boundary with a thickness of only several smectic layers. When the material gained a consistency of a smectic foam, the smectic aerogel structure was fixed by UV irradiation.

According to the present invention, the smectic aerogel comprising 4-nonyl-4'-cyanobiphenyl (9CB) and air bubbles (air cells) can be realized, as shown in FIG. 1. The pentagonal and hexagonal air cells are separated from each other by the smectic layers of the smectic liquid crystal. The thickness of the wall of the smectic layer at the boundary is about 24 μm, which corresponds to about 6,000 smectic layers. Of course, the thickness of the wall of the smectic layer at the boundary can be changed, and especially can be reduced to a thickness as thin as several smectic layers.

The physical properties of the aerogel, such as the density and refractive index, can easily be changed by changing the size of air bubbles and/or adjusting the types of gases, i.e., selecting inert gas or other different gases or a mixture of various gases.

The present invention is not limited to the embodiments described above, but various modifications are possible based on the spirit of the present invention, and they should not be excluded from the scope of the present invention.

The present invention provides a high quality smectic aerogel which is not brittle, and a method of producing thereof by using a host material comprising a mixture of a smectic liquid crystal and a UV curable material or a host material comprising a smectic UV-curable material and by selecting an appropriate host material.

INDUSTRIAL APPLICABILITY

By selecting an appropriate host material, the smectic aerogel and the production method thereof according to the present invention can be utilized as a high quality smectic aerogel which is not brittle.

What is claimed is:

1. A smectic aerogel having a fixed solid state aerogel structure of individual gas inclusion cells separated by smectic boundary layers, wherein the smectic boundary layers are formed by polymerizing a host material comprising a mixture of a smectic liquid crystal material with a smectic phase and a UV-curable monomer and fixing permanently a solid state aerogel structure after forming the gas inclusion cells.

2. A smectic aerogel having a fixed solid state aerogel structure of individual gas inclusion cells separated by smectic boundary layers, wherein the smectic boundary layers are formed by polymerizing a host material comprising a smectic UV-curable material with a smectic phase and fixing permanently a solid state aerogel structure by UV irradiation after forming the gas inclusion cells.

3. The smectic aerogel according to claim 1, wherein the UV-curable monomer is a monomer having an acrylate or methyl acrylate group.

4. The smectic aerogel according to claim 1, wherein the gas inclusion cells are formed by injecting a spherical gas inclusion into the host material before curing.

5. The smectic aerogel according to claim 4, wherein the gas in the gas inclusion is selected from air, inert gas, and mixtures thereof.

6. The smectic aerogel according to claim 4, wherein the wall thickness of the smectic boundary layers between the gas cells is from about 4 nanometers to about 24 μm.

7. The smectic aerogel according to claim 4, wherein the gas inclusion is arranged orderly and the gas inclusion cells have a hexagonal or a pentagonal shape.

8. The smectic aerogel according to claim 1, wherein the host material is fixed permanently by UV irradiation.

9. The smectic aerogel according to claim 1, wherein the density of the smectic aerogel is between 1.3 kg/m$^3$ and 400 kg/m$^3$.

10. The smectic aerogel according to claim 1, wherein the fixed solid state structure is formed in a bulk shape, and is cut from the bulk into a desired shape.

11. A method of producing a solid state smectic aerogel, comprising:
    (a) providing a smectic liquid crystal;
    (b) mixing the smectic liquid crystal with an ultra-violet (UV)-curable material to form an ultra-violet (UV)-curable mixture;
    (c) injecting a gas inclusion into the mixture; and
    (d) curing the mixture by UV irradiation to fix a solid state structure of the smectic aerogel permanently.

12. The method according to claim 11, wherein the smectic liquid crystal is 4-octyl-4'-cyanobiphenyl (8CB) or 4-nonyl-4'-cyanobiphenyl (9CB).

13. A method of producing a solid state smectic aerogel, comprising:
    (a) providing a smectic UV-curable material;
    (b) injecting a gas inclusion into the material; and
    (c) curing the material by UV irradiation to fix a solid state structure of the smectic aerogel permanently.

14. The method according to claim 11, wherein a spherical gas inclusion is injected into the mixture.

15. The method according to claim 11, wherein the mixture and the gas inclusion are placed under a hydrostatic pressure which is lower than the pressure during the injection of gas.

16. The method according to claim 15, wherein the thickness of a wall at the boundary of the gas inclusion in the cured mixture is from about 4 nanometers to about 24 μm.

17. The method according to claim 14, wherein the gas inclusion is arranged orderly in gas inclusion cells having a hexagonal or a pentagonal shape.

18. The method according to claim 11, wherein the solid state smectic aerogel formed has a density between 1.3 kg/m$^3$ and 400 kg/m$^3$.

19. The method according to claim 11, wherein the solid state smectic aerogel is initially formed in a bulk shape, and is then cut from the bulk into a desired shape.

20. The method according to claim 11, wherein the gas inclusion is injected into the mixture of the smectic liquid crystal with an ultra-violet (UV)-curable material while the smectic liquid crystal is in a nematic phase and the nematic phase is thereafter cooled down to the smectic phase.

21. The smectic aerogel according to claim 9, wherein the refractive index of the smectic aerogel is 1.2 or less.

22. The smectic aerogel according to claim 1, wherein the smectic liquid crystal is 4-octyl-4'-cyanobiphenyl (8CB) or 4-nonyl-4'-cyanobiphenyl (9CB).

* * * * *